I. KERN.
HAY RACK.
APPLICATION FILED NOV. 3, 1910.

987,377.

Patented Mar. 21, 1911.

3 SHEETS—SHEET 1.

Witnesses.
G. Nicholson
Jas Gadsby

Inventor.
Isaiah Kern
per Alfred J. Bratton
attorney

I. KERN.
HAY RACK.
APPLICATION FILED NOV. 3, 1910.
987,377.
Patented Mar. 21, 1911.
3 SHEETS—SHEET 2.
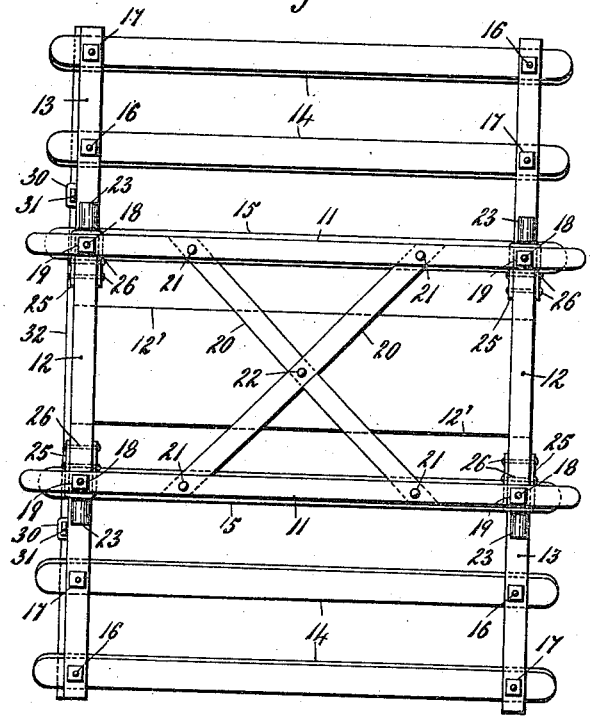
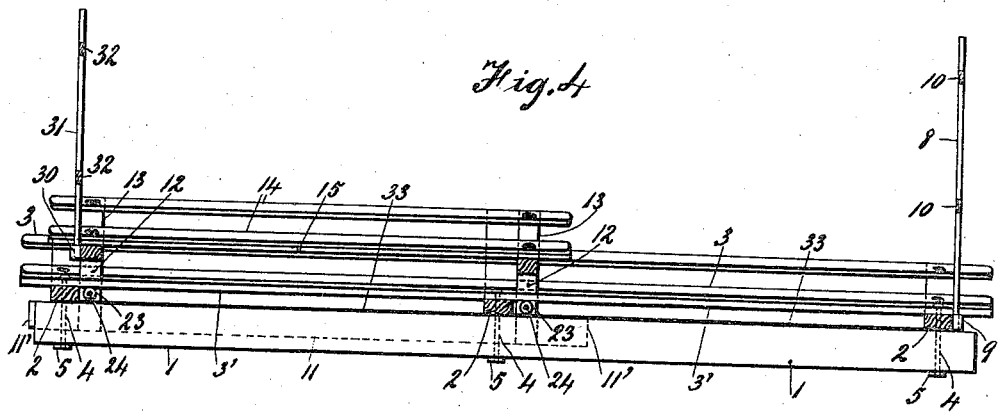

I. KERN.
HAY RACK.
APPLICATION FILED NOV. 3, 1910.

987,377.

Patented Mar. 21, 1911.
3 SHEETS—SHEET 3.

Witnesses.
G. Nicholson.
Jac Gudehy

Inventor.
Isaiah Kern
per. Alfred J. Bratton
attorney

UNITED STATES PATENT OFFICE.

ISAIAH KERN, OF RYCKMANS CORNER, ONTARIO, CANADA.

HAY-RACK.

987,377.  Specification of Letters Patent.  Patented Mar. 21, 1911.

Application filed November 3, 1910. Serial No. 590,510.

*To all whom it may concern:*

Be it known that I, ISAIAH KERN, a British subject, residing at Ryckmans Corner, in the county of Wentworth, in the Province of Ontario and Dominion of Canada, have invented new and useful Improvements in Hay-Racks, of which the following is a specification.

This invention relates to hay racks and more particularly to that type consisting of a frame adapted to be mounted on the running gears of a wagon and used by farmers for hauling hay, sheaves and the like.

The main object of my invention is to provide an improved hay rack of the foregoing character whereby a great saving in time and labor is effected.

A further object of my invention is to adapt the hay rack for more expeditious loading when used in combination with a hay loader; or, in other words to dispense with the employment of two hands thereon namely one to handle the hay, sheaves and the like as it is fed thereon and another to stack same at the front of the rack.

A still further object of my invention is to readily and expeditiously adapt the known forms of rack to my improvements.

With these objects in view, my invention consists essentially of a half-rack or car which is adapted to be transferred from end to end of the hay-rack proper; or in other words the car can be moved to the rear end of the hay rack, fully loaded and then moved bodily forward to the front end of said rack and the after part then loaded in the ordinary way.

Figure 1:
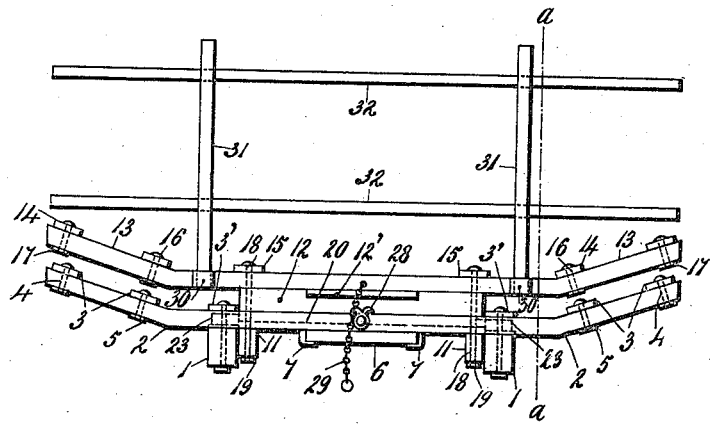
Figure 2:
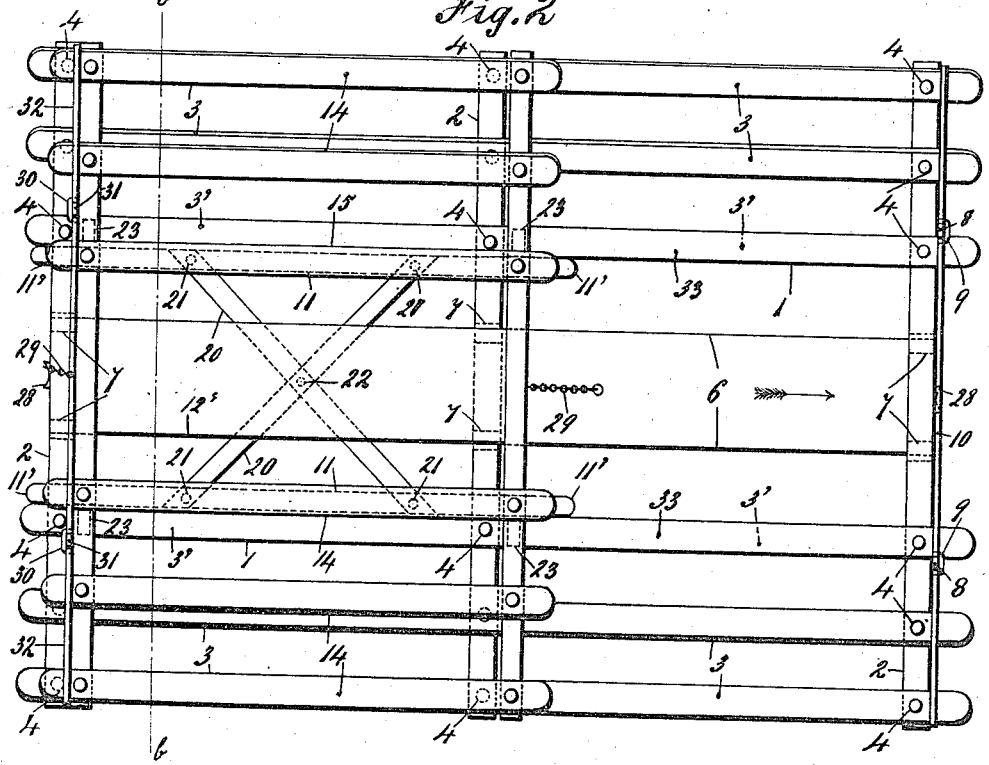
Figure 5:
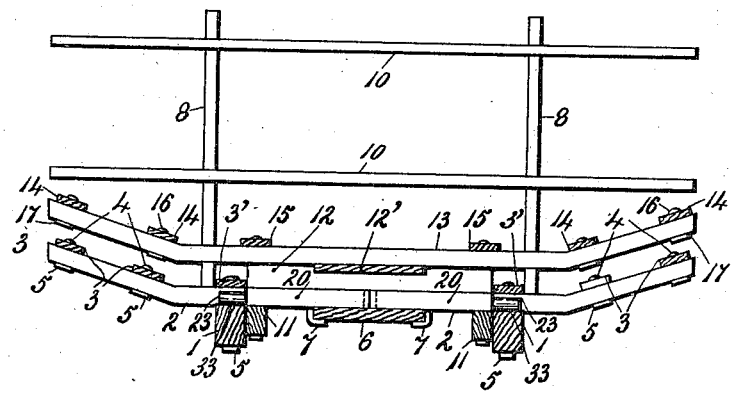
Figure 6:
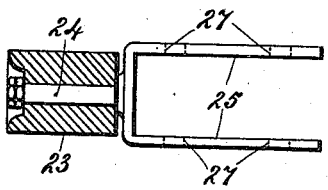
Figure 7:
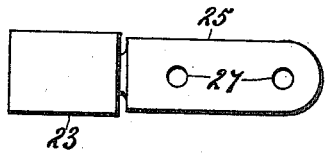

The accompanying drawings are in illustration of my invention:—Figure 1, is a diagrammatic front end view of my improved hay rack. Fig. 2, is a top plan view of the same. Fig. 3, is an underside plan of the car removed from the hay rack proper. Fig. 4, is a sectional elevation on the line *a—a*, in Fig. 1, and looking to the left thereof. Fig. 5, is a transverse section on the line *b—b*, in Fig. 2, looking to the right. Fig. 6, is a part sectional plan of one of the car supporting devices drawn to an enlarged scale; and Fig. 7, is a side elevation of the same.

Similar numerals refer to similar parts throughout the several views.

The hay rack proper is built as heretofore and comprises two main or base bearer beams 1, 1, which are adapted for mounting upon the running gears—not shown—of a wagon in any of the well known ways, and they may be bound together by cross ties, likewise not shown, to prevent lateral displacement.

2, 2, are the cross beams arranged transversely of the beams 1, 1, and 3, 3, 3', are the longitudinal or side beams which are conveniently secured to the aforesaid beams by means of bolts 4, 4, and nuts 5.

6, is the center or foot board which is supported and held in place by depending hanger brackets 7, 7, secured to the underside of the aforesaid cross beams 2, 2.

At the rear end of the hay rack I fit a ladder consisting of two or more uprights 8, 8, adapted for reception and support at their lower ends in sockets 9, 9, secured to the rear cross beam 2, and two or more cross bars 10, 10, suitably fixed to the aforesaid uprights 8, 8, by bolting or rabbeting. Obviously the cross beams 2, 2, may be made flat, crescent or other shape in side view and I do not restrict myself to the inclined side parts illustrated.

According to my invention I arrange upon the aforesaid hay rack a half-rack or car which is adapted to be moved longitudinally thereover and I wish to here point out that I have designated said car a half-rack inasmuch as its longitudinal dimension is approximately half that of the rack proper above described. This half rack is constructed as follows;—11, 11, are two longitudinally disposed beams which are spaced apart a distance equal to that intervening between the beams 1, 1, and they are connected together or have mounted thereon near their opposite ends two blocks or transverse frames 12, 12; and said beams are of a length in excess of the distance apart of any two adjoining cross beams 2, 2, whereby projections 11', 11', are insured at the ends of the half rack for the purpose hereafter explained; or more than two such blocks may be arranged at intervals along the aforesaid beams 11, 11, and have under cut parts for passage over the cross beams 2, 2.

12', is the center board of the half rack, detachably supported between and by the end blocks 12, 12.

13, 13, are cross beams of similar configuration in end view to the cross beams 2, 2, above described, and 14, 14, 15, 15, are longitudinally arranged bearers, the former of which are conveniently fixed to the cross beams 13, 13, by bolts 16, and nuts 17, and the latter whereof are similarly secured by bolts 18, passed through holes of corresponding cross-section provided for the purpose in registering alinement in said cross beams, 13, 13, transverse blocks 12, 12, and longitudinal beams 11, 11.

19, 19, are the nuts on the lower ends of the bolts 18, 18, for firmly securing all the aforesaid parts rigidly together.

It is to be particularly noted that I position the blocks 12, 12, relative to the beams 11, 11, so that the half rack can be traversed from one end to the other of the rack proper; or, in other words they are spaced apart a distance approximately equal to that between the cross beams 2, 2, and both of said blocks are located at the rear sides of the said front and center cross beams 2, 2, as will be clearly understood by a close inspection of the drawings. Furthermore the beams 11, 11, are positioned between the beams 1, 1, and are adapted for easy longitudinal movement.

In order to insure perfect rigidity of the under frame of the half rack I rabbet into the beams 11, 11, diagonally disposed ties or cross bars 20, 20, which are pinned thereto by pegs 21, 21, and they are similarly united at their point of intersection by a pin 22. Thus it will be seen that the underframe of the half-car is rendered perfectly rigid and that warping is entirely obviated.

23, 23, are rollers or wheels which are revolubly mounted on stub axles 24, formed integral with channel shaped straps 25, Figs. 6 and 7, and said straps are of a section to fit snugly around the ends of the blocks 12, to which they are secured by bolts or the like 26, passed through interregistering holes 27, in the said straps and correspondingly positioned holes in the said blocks 12. Obviously the rollers 23, may be replaced by flanged wheels and they may also be fitted with antifriction bearings to further insure easy running.

28, 28, are hooked locking devices of any appropriate character which are fitted at each end of the rack proper upon the end cross beams 2, 2, to which chains 29, 29, are adapted for connection to secure the half rack either at the forward or near end thereof as desired. At the front end of the half-rack I fit sockets 30, 30, for the reception of the more or less vertical members 31, 31, of a front ladder provided with cross bars 32, 32, suitably secured thereto in any of the well known ways.

33, 33, are metal strips secured to the upper surface of the main beams 1, 1, over which the rollers 23, 23, travel and they are preferably provided to obviate wear and tear on the wood work.

In use, and assuming my improved hay-rack to be mounted on the running gears of a wagon the half-rack is drawn to the rear of the rack proper in the direction of the arrow in Fig. 2, and locked there by the engagement of the rear chain 29, with the rear hook device 28, any upward movement of said half-rack being rendered impossible by the engagement of the rear projections 11', 11', beneath the rear cross-beam 2. When the half-rack is fully loaded the rear chain 29, is released and said half-rack is moved forward to its fullest extent or position shown on Fig. 2, and locked by the connection of the front chain 29, to the front hook device 28, the forward projections being then held beneath the front cross beam 2, as will be clearly understood from the illustrations. The rear ladder is then placed in position and the rest of the rack loaded in the ordinary way.

From the foregoing description it will be seen that by my invention it is made possible to dispense with two men—one at the front and another at the rear—on the rack while loading, one only being necessary at the rear end to handle the hay, sheaves and the like as it is fed on to said rack. Furthermore it will readily be recognized that my improvements are susceptible of easy adaption to existing hay-racks without any alteration excepting the fitment of the metal strips 33.

I claim:—

1. In combination with a hay rack of the type set forth, a half-rack consisting of longitudinally and parallel disposed beams connected together by end blocks and provided with extensions beyond said end blocks, transversely arranged cross beams mounted on said end blocks, longitudinal bearers on said cross beams, bolts and nuts for securing all said parts together in assembled relation, a foot board carried by the end blocks, diagonal bars attached to said longitudinal beams and secured rigidly together at their point of intersection, channel shaped straps having formed integral therewith stub axles bolted to the aforesaid end blocks, rollers revolubly mounted on said stub axles, a ladder detachably carried at the front end of the half-rack, and means for securing said half-rack to the rack proper, substantially as described for the purpose specified.

2. In combination with a hay rack of the type specified and having metal strips fitted on to the longitudinal beams thereof, the half rack comprising longitudinal and parallel disposed beams 11, 11, having end projections 11', 11', and being connected together by end blocks 12, 12, transversely arranged cross beams 13, 13, mounted on the aforesaid end blocks, longitudinal bearers 14, 14, 15, 15, mounted on said cross beams 13, 13, bolts and nuts 16, 17, 18, 19, for securing said longitudinal bearers, cross-beams and end blocks rigidly together, foot board 12' carried by the aforesaid end blocks, diagonal bars 20, 20, attached to the longitudinal beams and together by pins 21, 21, 22, respectively, rollers 23, 23, revolubly mounted on stub axles 24, formed integral with channel shaped straps 25, means for fixing said straps to the aforesaid blocks 12, 12, sockets 30, 30, uprights 31, supported in said sockets and cross bars 32, 32, attached to said uprights, all substantially as shown for the purpose specified.

Signed at Hamilton, Ontario, Canada, this 29th day of October, 1910.

ISAIAH KERN.

Witnesses:
ALFRED T. BRATTON,
G. NICHOLSON.

Copies of this patent may be obtained for five cents each, by addressing the "Commissioner of Patents, Washington, D. C."